Patented Oct. 30, 1945

2,387,827

UNITED STATES PATENT OFFICE 2,387,827

CORE OIL

Joseph N. Borglin, Wilmington, Del., assignor to Hercules Powder Company, Wilmington, Del., a corporation of Delaware No Drawing. Application February 9, 1942, Serial No. 430,079

7 Claims. (Cl. 22—188)

This invention relates to novel core oils or liquid core binders and a method for their preparation.

In the casting of metals, sand cores consisting of sand and a suitable binder are employed. The binders employed are generally organic in nature and have certain definite requisites. They must be economical in cost. They must wet sand readily, and when admixed with sand, should not adhere to the core box or mold. They should provide what is known as green bond to the sand mix, and this mix when molded must bake to a hard tough core. Since cores are frequently prepared several weeks before their ultimate use, it is also necessary for the binder to be non-hygroscopic and to retain its binding qualities for a protracted period.

The binders used heretofore are oils comprising a mixture of rosin, linseed oil, petroleum oil and a volatile solvent. Rosin alone as a binder gives a soft core which readily disintegrates while linseed oil produces a hard core. By varying the proportions of these two ingredients, the properties of the resulting cores can be varied to suit the prevailing conditions. However, these core oils have several disadvantages. The rosin tends to crystallize or sludge out of solution. This naturally destroys the homogeneity of the solution, and also causes a lack of uniformity in the resulting core. Various methods have been suggested for obviating the difficulty, as for example, the addition of rosin soaps to the rosin or the formation of rosin soaps in situ by the addition of alkali in accordance with U. S. 2,042,877 to J. N. Borglin. The resulting oil is, however, unsatisfactory inasmuch as the rosin soaps in the finished core are hygroscopic and tend to lower the permeability characteristics of the same. Furthermore, the presence of these soaps in the dried core tends to increase scabbing with the consequent production of rough castings. None of the methods for overcoming the deficiencies of rosin-linseed oil binders have been entirely satisfactory.

Now, in accordance with this invention, it has been found that core oils which are definitely superior to those heretofore available result from the use of polymerized rosin in conjunction with a drying oil. As desired, the composition may include varying amounts of a petroleum oil in accordance with the practice of the art. Volatile solvents may be added to obtain a core oil of proper working viscosity. Such core oils show excellent resistance to crystallization and provide castings having higher tensile and dry compression strength than those heretofore available.

The polymerized rosins which are contemplated herein and which impart the unusual characteristics to the core oils of the invention are those chemically-modified rosins prepared from any of the various grades of wood or gum rosin by treatment of the same with various polymerization catalysts, such as, boron trifluoride, hydrogen fluoride, aluminum chloride, stannic chloride, zinc chloride, sulfuric acid, etc., or any other catalysts having a polymerizing effect on rosin. The polymerization is generally carried out with the rosin dissolved in an inert solvent such as benzol, gasoline, etc. It is contemplated, too, that the various rosin acids, such as, abietic, pimaric, sapinic, sylvic, etc., obtainable from the aforesaid wood and gum rosins, be polymerized and used equivalently with the aforesaid polymerized rosins in accordance with this invention.

Having now described the invention in a general manner, a more detailed description thereof will be given in the following examples. It is to be understood, however, that the invention is not to be limited to the particular compositions shown in the examples, but that they are merely illustrative. All parts and percentages are by weight, unless otherwise indicated.

Example 1

A core oil was prepared using the following raw material formulation:

| | Parts |
|---|---|
| Polymerized rosin | 400 |
| Linseed oil | 400 |
| Kerosene | 200 |

The particular polymerized rosin employed was one prepared by the use of a sulfuric acid catalyst. It had a drop melting point of 102° C. This polymerized rosin and the linseed oil were heated to 235° C. at which temperature the polymerized rosin had entirely gone in solution. When the solution had cooled to 70° C., the kerosene was added.

Utilizing this core oil as a binder, a core mix was prepared having the following composition:

| | Parts |
|---|---|
| New Jersey No. 60 silica sand | 3000 |
| Polymerized rosin core oil | 60 |
| Water | 120 |

This core mix was molded into various shapes, and the resulting cores baked for one hour at 400° F. The cores so prepared had a tensile strength of 166 lbs./sq. in. and a dry compression strength of 900 lbs./sq. in. as determined on the standard Dietert sand strength machine. Similar cores prepared using a core oil having the same composition as the one above but using WW gum rosin in place of the polymerized rosin had a tensile strength of only 116 lbs./sq. in. and a dry compression strength of 846 lbs./sq. Additional cores were then prepared using McConnellsville sand instead of the New Jersey No. 60 variety. Those cores prepared from the polymerized rosin core oils had a tensile strength of 112 lbs./sq. in. and a dry compression strength of 646 lbs./sq. in. as compared with a tensile strength of 84 lbs./sq. in. and a dry compression strength of 583 lbs./sq. in. for cores made using the WW gum rosin core oil. These tests demonstrated conclusively that the use of polymerized rosin core oils in foundry operations gave cores of much greater tensile strength and dry compression strength than have heretofore been obtainable, regardless of the particular type of sand employed in the formulation.

*Example 2*

To illustrate the fact that polymerized rosin core oils do not develop crystals over extended periods of time, a core oil was made up employing the following formulation:

| | Parts |
|---|---|
| Polymerized rosin | 400 |
| Linseed oil | 300 |
| Kerosene | 300 |

The polymerized rosin employed in this instance was one polymerized using a sulfuric acid catalyst; it had a drop melting point of 98° C. and an acid number of 150. This polymerized rosin and the linseed oil were heated to 150° C. and the kerosene then stirred in. A portion of the resulting core oil and one prepared utilizing a similar formula with the exception that N wood rosin was used in place of polymerized rosin were placed in 4-ounce oil bottles and observed for crystallization. The N wood rosin product developed crystals in 12 days, whereas the polymerized rosin core oil did not develop crystals over a period of 58 days, at which time the test was discontinued.

*Example 3*

As illustrative of the fact that the substitution of a substantial quantity of wood rosin with polymerized rosin in a core oil formula will give very advantageous results, the following formulation was utilized in the preparation of a core oil:

| | Parts |
|---|---|
| I wood rosin | 280 |
| Polymerized rosin | 120 |
| Linseed oil | 300 |
| Kerosene | 300 |

The particular polymerized rosin herein employed was one polymerized using a sulfuric acid catalyst and had a drop melting point of 97° C. It along with the other ingredients was treated in accordance with the method of Example 2 to yield the desired core oil. As a standard, a similar core oil was prepared utilizing I wood rosin alone. This standard core oil developed crystals in 4 days, while the core oil containing both the polymerized rosin and the I wood rosin had not developed any crystals after 22 days had elapsed, at which point the test was discontinued.

*Example 4*

As illustrative of the advantageous use of polymerized rosin in core oils which have been modified with a petrodeum oil, a core oil using the following formulation was prepared:

| | Parts |
|---|---|
| Polymerized rosin | 400 |
| Linseed oil | 50 |
| Kerosene | 440 |
| Light petroleum oil (29° Bé.) | 100 |
| Pine oil | 10 |

The polymerized rosin was one polymerized with a sulfuric acid catalyst, having a drop melting point of 100° C. Utilizing the above ingredients, a core oil was made up as follows. The polymerized rosin and light petroleum oil were heated to 150° C.; linseed oil was then added. Upon cooling slightly, keorsene was introduced with vigorous stirring. When completely cooled, pine oil was added to the solution. A standard core oil was prepared utilizing I wood rosin in place of polymerized rosin. This latter core oil developed crystals almost immediately upon cooling to room temperature, whereas the core oil containing the polymerized rosin showed no evidence of crystallization over a period of 49 days, at which point the test was discontinued.

*Example 5*

An additional core oil was made up using the following raw material formulation:

| | Parts |
|---|---|
| Polymerized rosin | 400 |
| Linseed oil | 300 |
| Kerosene | 300 |

The polymerized rosin employed was one prepared with the use of a boron trifluoride catalyst. It had a drop melting point of 108° C. and an acid number of 167. Utilizing a similar method to that employed in Example 2, a core oil was prepared which showed no crystal formation over a period of 6 months as compared with a standard I wood rosin core oil which crystallized after standing for 7 days.

The examples have illustrated that polymerized rosins of varying drop melting points may be utilized. In general, any polymerized rosin having a drop melting point between about 90° C. and about 176° C. may be employed. These polymerized rosins may vary in acid number between about 120 and about 165. The polymerized rosins which are of preferred utility are those having a drop melting point between about 95° C. and about 150° C. Using these materials, the advantages inhering in the resulting core oils are more strikingly apparent. The polymerized rosins having relatively high drop melting points, i. e., between 135° C. and 176° C. are obtained by the reduced pressure distillation of the polymerized rosins resulting from contacting rosin with the aforementioned polymerization catalysts. In this manner the unpolymerized portion of the rosin is either partially or completely removed. Another method of obtaining a polymerized rosin of relatively high melting point results from the process of polymerizing rosin with a sulfuric acid catalyst. In this process, a sludge separates out. This sludge contains highly polymerized material, sulfuric acid and some solvent. It is then simultaneously water-washed and extracted with a suitable inert, water-immiscible solvent, such as, benzene, xylene, diethyl ether, etc. The solvent extract is water-washed and the rosin recovered by evaporation. This product known as sludge rosin may be equivalently employed as the polymerized rosin utilized in accordance with this invention.

Although linseed oil was employed in the examples, and is perhaps universally employed as the drying oil constituent of the core oil, other drying oils may successfully be employed. Examples are menhaden fish, soybean, China-wood, oiticica, sardine, dehydrated castor, sesame, rapeseed, walnut, perilla oil, etc., also mixtures of the aforesaid. The term "drying oil," as used herein, is intended to be comprehensive enough to include the so-called semidrying oils. Furthermore, it is within the scope of this invention to utilize, in addition to the polymerized rosin and drying oil, a suitable petroleum oil in the preparation of the core oil. The use of a petroleum oil, however, will tend to decrease the strength of the core, and it will be realized that although the use of such material may impart certain desirable characteristics to the finished core, it will not have the maximum strength which would otherwise be obtainable.

The use of kerosene as a volatile solvent has been illustrated. It will generally be employed on account of its low cost and slow evaporation rate. However, this does not preclude the use of other solvents, such as, the petroleum solvents, V. M. & P. naphtha, mineral spirits, etc., the aromatic solvents, such as, solvent naphtha, Hi-Flash naphtha, etc. It will be realized that the amount of volatile solvent employed in any core oil will depend upon the viscosity with which it is desired to work. In general, it may be said that the solvent portion of the core oil should be sufficient so that the core oil will have a viscosity not greater than about 150 centipoises and not less than about 50 centipoises. Although core oils having viscosities without this range may be employed they are deficient in mixing properties.

The examples have illustrated that the novel core oils contemplated may have varying non-volatile compositions. In general the various non-volatile ingredients may be present in the following proportions by weight:

| | Percent |
|---|---|
| Polymerized rosin | 5-95 |
| Drying oil | 10-65 |
| Petroleum oil | 0-20 |

Preferably, the non-volatile ingredients will be present in the following proportions by weight:

| | Percent |
|---|---|
| Polymerized rosin | 10-65 |
| Drying oil | 35-90 |
| Petroleum oil | 0-20 |

The general procedure used for the preparation of core oils in accordance with the invention is as follows. The polymerized rosin and the oil are heated together until dissolved within a temperature range of 150° C. to 235° C. At a suitable lower temperature the solvent is stirred in. Alternatively, with enclosed equipment, generally heated by oil or steam, the entire charge may be heated with stirring until a solution results.

Instead of using polymerized rosin as the sole resin constituent in the core oils prepared in accordance with the invention, it has been found that suitable blends of polymerized rosin with ordinary wood or gum rosin may be employed. In this manner, the crystallization of the resin constituents from the core oil formulations is considerably reduced as compared with core oil formulations utilizing straight wood or gum rosin or mixtures thereof. By utilizing blends of polymerized rosin with ordinary rosin, it is also possible to obtain stronger cores than is possible in utilizing only wood or gum rosin. The amount of polymerized rosin necessary to effect this improvement ranges from 25 to 60% of the total resinous constituents depending upon two factors: one, the nature or type of the rosin which has been polymerized, and, two, the degree to which the rosin has been polymerized. Blends of polymerized and unpolymerized wood or gum rosin are accordingly within the scope of this invention subject to the limitations described.

Core oils prepared in accordance with the disclosed processes have the advantage of resisting crystallization over extended periods of time. Accordingly, these core oils retain a uniform concentration in storage and introduce a degree of uniformity into core making hitherto unobtainable. Core oils prepared from polymerized rosin also have the property of improving the tensile strength and dry compression strength of their cores as compared with cores containing a similar binder differing only in that gum or wood rosin is substituted for the polymerized rosin. This improved tensile and compression strength of cores made from polymerized rosin core oils enables the use of lesser quantities of polymerized rosin while still producing cores of the same tensile strength as are produced using a greater amount of ordinary wood or gum rosin. Accordingly, the foundry costs are reduced.

The advantages inherent in the present core oils are obtained without any accompanying disadvantages. The cores resulting from their use are characterized by having good green bond. Upon baking, cores characterized by high tensile strength and excellent permeability properties are obtained. Furthermore, the cores are not hygroscopic and can be stored for periods prior to their actual use without changing their original permeability. Practically no scabbing is encountered during the casting operation such that the resulting castings are uniformly smooth.

What I claim and desire to protect by Letters Patent is:

1. A core oil comprising as essential ingredients from 5 to 95% of polymerized rosin and from 10 to 65% of a drying oil, said percentages being based upon the non-volatile ingredients in the core oil.

2. A core oil comprising as essential ingredients from 5 to 95% of polymerized rosin having a melting point by the drop method between about 90° C. and about 176° C. and from 10 to 65% of a drying oil, said percentages being based upon the non-volatile ingredients in the core oil.

3. A core oil comprising as essential ingredients from 5 to 95% of polymerized rosin having a melting point by the drop method between about 90° C. and about 176° C., a petroleum oil and from 10 to 65% of a drying oil, said percentages being based upon the non-volatile ingredients in the core oil.

4. A core oil comprising as essential ingredients from 5 to 95% of polymerized rosin having a melting point by the drop method between about 90° C. and about 176° C., a petroleum oil, from 10 to 65% of a drying oil and a volatile solvent, said percentages being based upon the non-volatile ingredients in the core oil.

5. A core oil comprising as essential ingredients from 5 to 95% of polymerized rosin having a melting point by the drop method between about 90° C. and about 176° C., from 10 to 65% of linseed oil and kerosene, said percentages being based upon the non-volatile ingredients in the core oil.

6. A core oil comprising as essential ingredients from 5 to 95% of rosin, polymerized rosin having a melting point by the drop method between about 90° C. and about 176° C. and from 10 to 65% of a drying oil, said percentages being based upon the non-volatile ingredients in the core oil.

7. A core oil comprising as essential ingredients from 5 to 95% of polymerized rosin having a melting point by the drop method between about 95° C. and about 150° C. and from 10 to 65% of a drying oil, said percentages being based upon the non-volatile ingredients in the core oil.

JOSEPH N. BORGLIN.

CERTIFICATE OF CORRECTION.

Patent No. 2,387,827.   October 30, 1945.

JOSEPH N. BORGLIN.

It is hereby certified that error appears in the printed specification of the above numbered patent requiring correction as follows: Page 2, first column, line 8, for "846 lbs./sq." read --846 lbs./sq. in.--; page 4, first column, line 4, claim 6, strike out "rosin," and insert the same after the syllable "ents", same line; and that the said Letters Patent should be read with this correction therein that the same may conform to the record of the case in the Patent Office.

Signed and sealed this 5th day of February, A. D. 1946.

Leslie Frazer (Seal)   First Assistant Commissioner of Patents.

ing based upon the non-volatile ingredients in the core oil.

6. A core oil comprising as essential ingredients from 5 to 95% of rosin, polymerized rosin having a melting point by the drop method between about 90° C. and about 176° C. and from 10 to 65% of a drying oil, said percentages being based upon the non-volatile ingredients in the core oil.

7. A core oil comprising as essential ingredients from 5 to 95% of polymerized rosin having a melting point by the drop method between about 95° C. and about 150° C. and from 10 to 65% of a drying oil, said percentages being based upon the non-volatile ingredients in the core oil.

JOSEPH N. BORGLIN.

CERTIFICATE OF CORRECTION.

Patent No. 2,387,827. October 30, 1945.

JOSEPH N. BORGLIN.

It is hereby certified that error appears in the printed specification of the above numbered patent requiring correction as follows: Page 2, first column, line 8, for "846 lbs./sq." read --846 lbs./sq. in.--; page 4, first column, line 4, claim 6, strike out "rosin," and insert the same after the syllable "ents", same line; and that the said Letters Patent should be read with this correction therein that the same may conform to the record of the case in the Patent Office.

Signed and sealed this 5th day of February, A. D. 1946.

Leslie Frazer (Seal) First Assistant Commissioner of Patents.